June 9, 1931.  H. WILLSHAW ET AL  1,809,433
APPARATUS FOR VULCANIZING TIRES
Filed March 15, 1928   4 Sheets-Sheet 1

INVENTOR
HARRY WILLSHAW.
THOMAS NORCROSS.
FREDERICK GEORGE BROADBENT.
BY
ATTORNEY

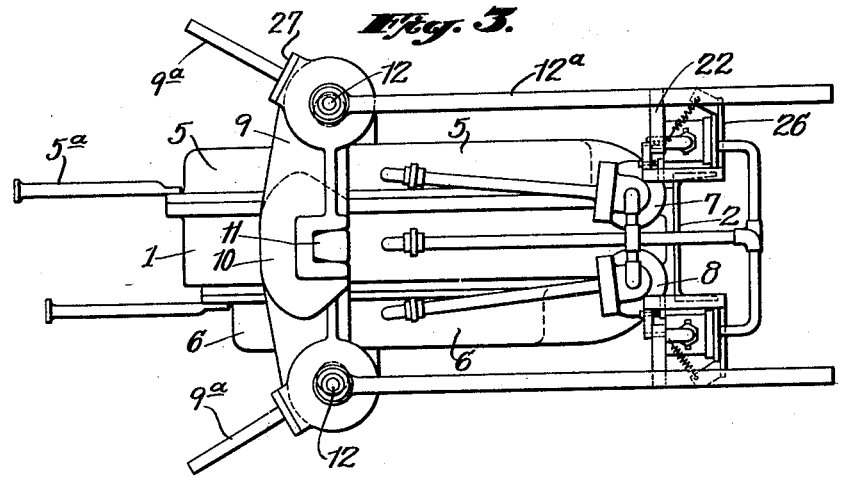
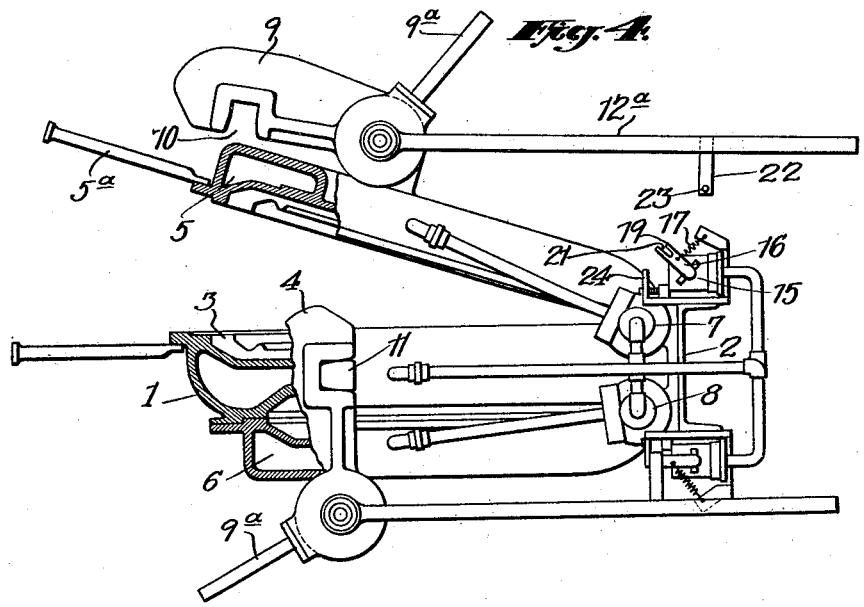
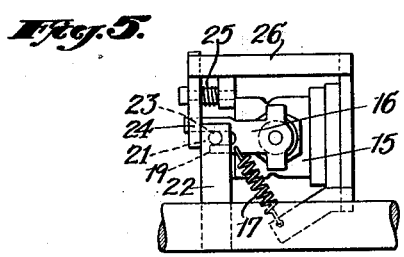
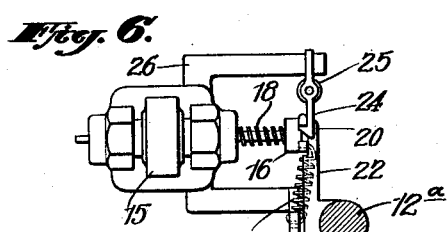

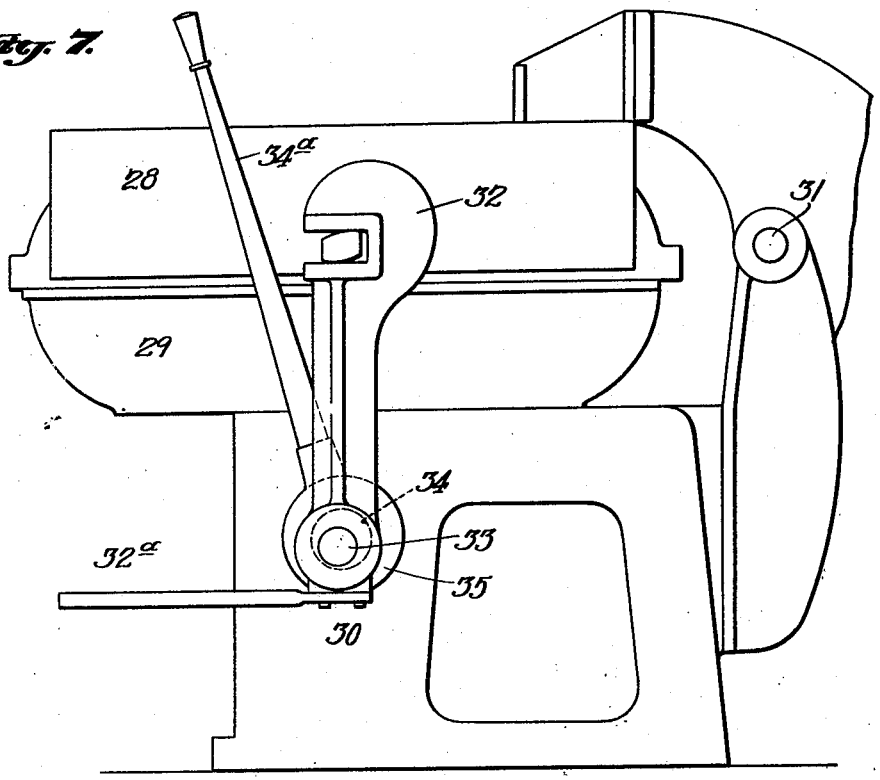
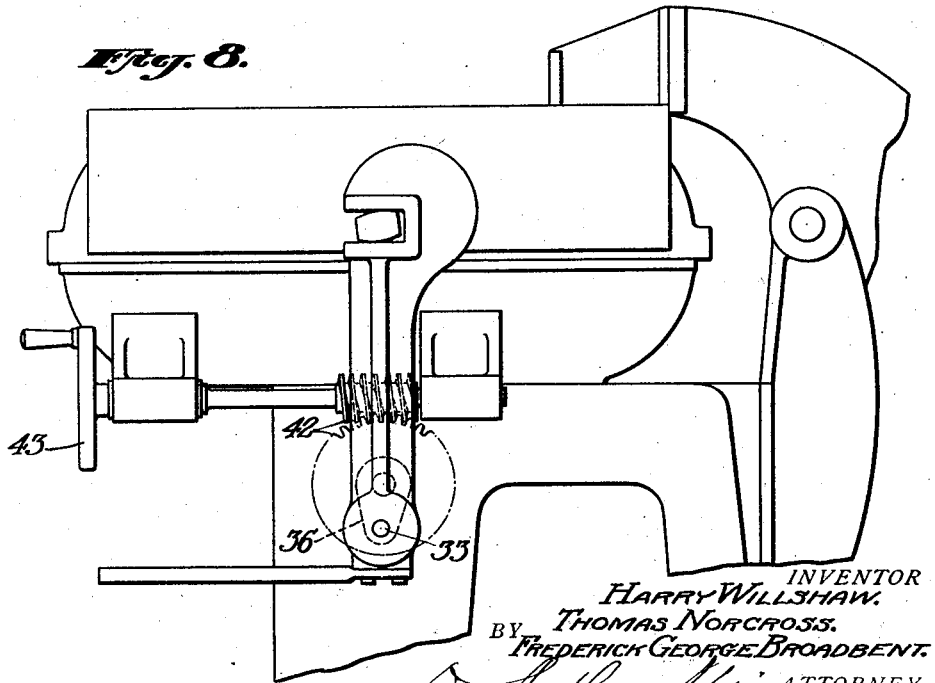

June 9, 1931.   H. WILLSHAW ET AL   1,809,433
APPARATUS FOR VULCANIZING TIRES
Filed March 15, 1928   4 Sheets-Sheet 4
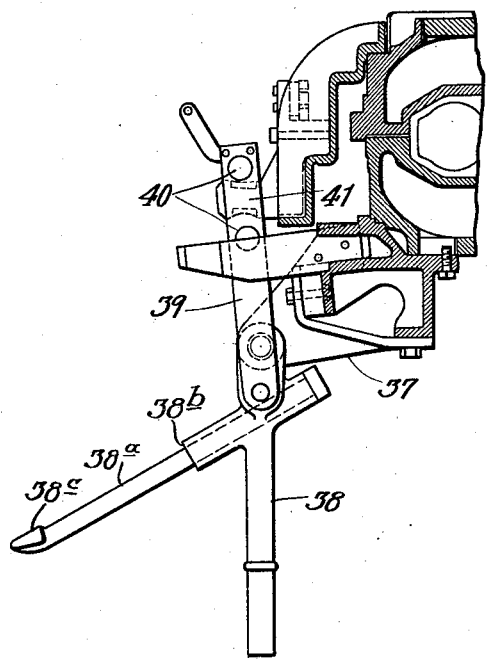
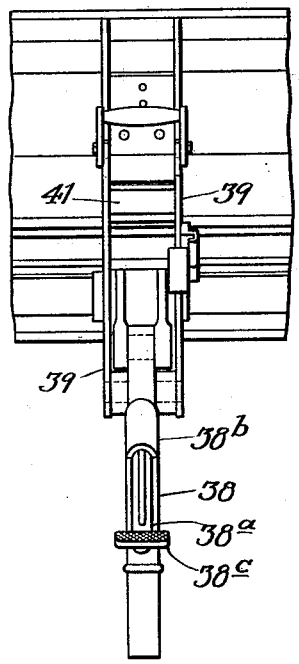

Patented June 9, 1931

1,809,433

UNITED STATES PATENT OFFICE

HARRY WILLSHAW, THOMAS NORCROSS, AND FREDERICK GEORGE BROADBENT, OF ERDINGTON, ENGLAND, ASSIGNORS TO DUNLOP TIRE AND RUBBER CORPORATION, OF BUFFALO, NEW YORK, A CORPORATION OF NEW YORK

APPARATUS FOR VULCANIZING TIRES

Application filed March 15, 1928, Serial No. 261,763, and in Great Britain March 19, 1927.

This invention relates to apparatus for molding and vulcanizing with internal pressure the outer cover of pneumatic tires, inflatable tubes, and the like, and to apparatus of the kind which includes annular heating chests hinged in relation to or similarly associated with each other and adapted to embrace the respective halves of the mold.

It is an object of the said invention to provide improved means whereby the required pressure may be exerted between the said heating chambers more expediently than has hereto been possible. A further object is to associate together, such means and control means for the fluid pressure supply to the interior of the tire so as to ensure for instance that pressure is within the product when the apparatus is closed, and only then.

According to this invention, therefore, provision is made whereby the required pressure is exerted between the chests with the aid of a suitable system of eccentric, crank or toggle mechanism or other analogous system of a like kind and whereby the mold members are operably dissociable from the influence of said eccentric, crank or toggle mechanism, or vice versa so that the said mechanism functions, not during the whole of the movement of the chests but only initially to open said mold members, finally to close such members and to maintain them closed or assist in such maintenance. Provision is also preferably made whereby the said pressure exerting system or parts associated with it, co-acts with the fluid pressure control; the one to prevent or occasion the actuation of the other as desired.

When the fluid pressure control and the linkage are associated together, we may provide that the linkage, in closing the apparatus, operates the fluid pressure supply valve to admit pressure to the product. Concomitantly the said linkage preferably engages a detent which must be released before the said linkage can be actuated to open the apparatus. Release of the detent occasions concurrent operation of the fluid pressure supply valve to release pressure from the product.

In order that our invention may be more easily understood and readily carried into effect, the same will now be described with reference to the accompanying drawings in which:

Fig. 3 is a plan view showing the apparatus closed;

Fig. 4 is a plan view partly in section showing one part of the apparatus opened;

Fig. 5 is a plan view of the fluid pressure control mechanism;

Fig. 6 is an end view thereof;

Fig. 7 and Fig. 8 are side views of alternative embodiments of our invention;

Fig. 9 is a side view partly in section of another alternative, and Fig. 10 is a front view of the same.

Figure 1:
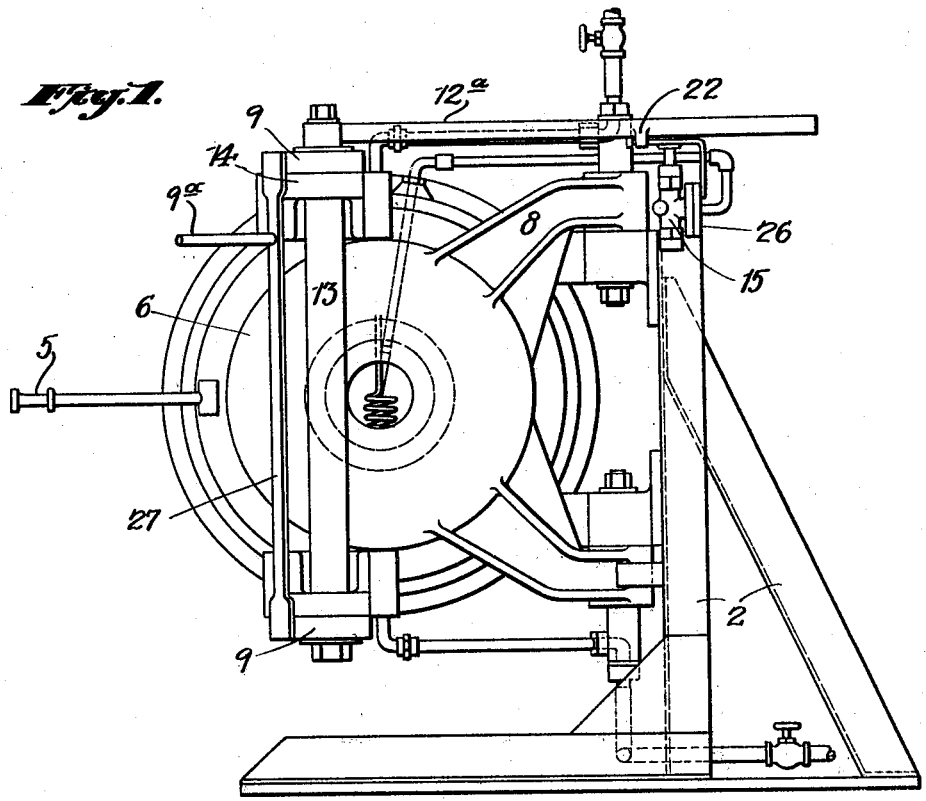
Fig. 1 is a side view of apparatus constructed according to one embodiment of our invention.
Figure 2:
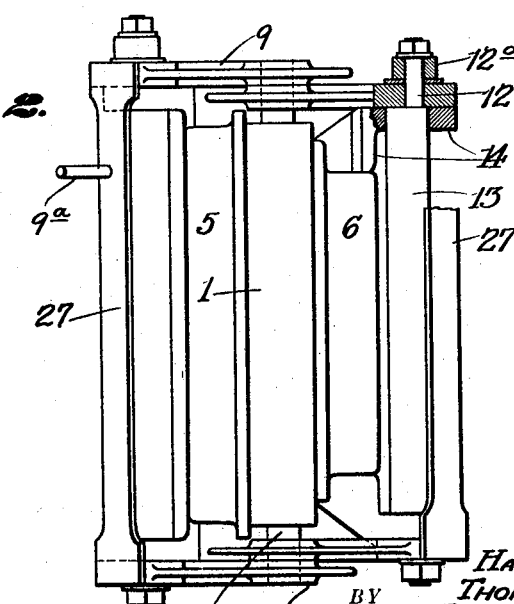
Fig. 2 is a part end view thereof.

Referring then to Figs. 1 to 6, therein our invention is shown applied to apparatus including; a centre chest 1 rigidly mounted upon a suitable frame structure 2 and having a mold cavity 3 and 4 respectively in each of its two opposite faces; and two complementary side chests 5 and 6 hinged respectively at 7 and 8 relative to the said centre chest 1. Each said side chest and its associated features are substantially similar except in size, the ensemble providing two constructually similar and independently operable units; and therefore it will suffice to direct the description mainly to one such unit.

In the preferred construction of one of the pressure applying units, in this particular application of our said invention, the same includes a link 9 pivotally mounted on the hinged chest and adapted to be swung freely into and out of engagement with the fixed chest; said link having a claw-like end 10 adapted to co-act with a projection 11 of the said fixed chest. As shown particularly in Fig. 2 the said pressure link is rotatably mounted upon an eccentrically disposed extension 12 of a spindle 13 rotatably mounted in a bracket 14 rigidly affixed to the hinged chest.

In operation the raw tire having been placed in position, the hinged chest (say 5) is swung, with the aid of a handle 5ª freely against the fixed chest. Then the link 9 is swung, with the aid of a handle 9ª, freely into engagement with the projection 11 of the said fixed chest. That done it will be apparent that the extension 12 is restrained against movement other than rotary. Thus in carrying out the next step in the operation, that of rotating the said extension 12, with the aid of a handle 12ª, the spindle 13 is rotated bodily about the axis of the said extension 12 thereby to displace sideways the hinged chest wherein it is mounted to force the said chest under the requisite pressure against the fixed chest.

To open the apparatus, the sequence of operation is merely reversed.

The fluid pressure control, in the preferred arrangement includes; firstly, a valve 15 whereof the operating key 16, having a turning spring 17 and a laterally actuating spring 18, is extended at 19 and 20 (Fig. 4) to form a slot 21; secondly, upon the link-operating handle 12ª, an extension 22 carrying a pin or spigot 23; and, thirdly, a detent comprising a pivotal catch 24 actuated by a spring 25; said valve and said detent being carried by a bracket 26 rigidly attached to the framework 2 of the apparatus.

In operation, the apparatus being open, the valve 15 is maintained closed by the influence of the spring 17. In closing the apparatus as hereinbefore described, the pin 23, swinging with the handle 12ª first engages the slot 21 and then contacts with the extension 20 to rotate the key 16 to open the valve 15 to submit the product to fluid pressure. In doing that the said key 16 engages the detent 24, the extension 20 passing into the embrace of the catch 24; said key being meantime held in the required position by the spring 18. To open the apparatus the key 16 is depressed manually against the resistance of the said spring 18 and being thus free of both the catch 24 and the pin 23 rotates under the influence of the spring 17, to exhaust pressure from the product and close the valve. The apparatus is then ready for opening as hereinbefore described.

It will be apparent that our invention is not limited to the precise construction or application set out in the foregoing.

For instance in the fluid pressure control we do not essentially utilize a detent, such as 24, but it is preferred because it reduces the chances of the apparatus being opened before full exhaustion of the fluid pressure from the product.

And again, although only one pressure unit is referred to, it will be apparent that we may in fact use a plurality, not necessarily all of the kind according to this invention. In the application of our invention above referred to however, we preferably utilize as shown particularly in Figs. 1 and 2 a commonly actuated pair of the units described, associated together, for free swinging by the bar 27, and for the exertion of pressure by the common spindle 13.

Again instead of applying our invention to apparatus disposed vertically or having more than one molding cavity, it will be apparent that we may alternatively apply it to apparatus disposed horizontally or having only one molding cavity.

For instance as illustrated in Fig. 7, our invention may be applied to apparatus of the kind including two heating chambers 28 and 29 horizontally disposed, the lower chamber rigid upon a base structure 30 and the top chamber hinged at 31 relative to the said lower chamber. Our invention may be applied in any appropriate manner and embodiment, but preferably we utilize pressure links similar to those used in the first herein described embodiment.

In this instance however the pressure link, 32, is mounted upon the base structure 30 and its claw-like end is adapted to be swung, as by a handle 32ª, into engagement with the hinged chest, the said pressure link being preferably rotatably mounted upon an eccentric extension 33 of a spindle 34 rotatably mounted in the said base structure 30. In this instance then, the spindle 34 is obviously restrained against movement other than rotary and thus when the said spindle is rotated, as by a handle 34ª extending from a collar 35 rigid with the spindle, the said extension 33 is caused to rotate bodily about the axis of the said spindle 34 thereby to displace the link 32 to exert the pressure required for closing or for opening the apparatus according to the direction of the said rotation.

And again it will be apparent that we are not limited to the hereinbefore described form of the kind of pressure exerting system referred to. For instance as is exemplified in Fig. 8 we may utilize a form of the said system embodying a crank as 36, or as exemplified in Fig. 9 a form embodying toggle links. Apparatus constructed according to the latter embodiment conveniently comprises upon the fixed chest a bracket 37 upon which is hinged a handle 38. Pivoted to the said handle is a link 39 which coacts with the hinged chest to exert, when the handle is actuated, the required pressure in the desired direction. Preferably as shown particularly in Fig. 10 the link is of girder construction being formed by two plates spanned at the ends remote from the pivot, by members 40 adapted to engage alternately opposite sides of a bracket 41 upon the hinged chest. The handle 38 may be branched as shown at 38ª to ensure that operating provision is readily accessible at the stages of both opening and closing of the apparatus. In order that the branching shall not create obstruction preferably either of the branches is slidably mounted in a hub 38^b of the other. Further, a pedal 38^c may be made to facilitate actuation by foot.

Again although the description indicates only that the pressure system is actuated by manual effort exerted directly it will be apparent that we do not confine ourselves either to manual actuation or to actuation in the direct manner indicated. For instance, the required effort, either manual or other, may be exerted by a suitable system of gearing. To exemplify, in the scheme illustrated in Fig. 8 we might conveniently utilize worm gearing 42 operated by a hand wheel 43 or alternatively power driven in any convenient way. Preferably the worm gearing would be of the non-reversible or self-locking kind, thereby providing that the apparatus could be locked at any convenient point and not only when the pivot 33 for instance has passed over dead centre.

And finally when more than one pressure applying unit is provided any or all of the said units may be caused to be interdependent with the fluid pressure control, in a manner for instance, when we use auxiliary clamps, as set forth in our prior British Patent No. 272,992.

Various other modifications may be made by those skilled in the art without departing from the invention as defined in the following claims.

What we claim is:

1. Apparatus of the type described which comprises a chest in two parts, a link concentrically mounted on one part and adapted to engage the other of said parts with its free end, means for turning said eccentric against the part on which it is mounted, and means actuated by said eccentric turning means when the free end of said link is in engagement with said second part to admit fluid under pressure to the work within said chest.

2. Apparatus of the type described which comprises a chest in two parts, a shaft mounted on one of said parts, links eccentrically mounted on the ends of said shaft and having free ends adapted to engage the other part, a valve for admitting fluid under pressure to the work within said chest, and a lever mounted on said shaft and adapted to open said valve when the free ends of said links are engaged and said shaft is rotated.

3. Apparatus of the type described which comprises a chest in two parts, means for clamping and forcing said parts together to closed position, means for admitting fluid to the work in said chest, said means comprising a valve having an actuating key, means on said mold part forcing mechanism engaging said key and moving it to open position as said forcing means is actuated towards closing position and being locked to said key, and means to lock said key, said key being manually releasable from said locking means and from said forcing means, and means to move said key to open position upon its release.

4. Apparatus of the type described which comprises a chest in two parts, a link pivoted to one of said parts and movable to engage the other, an eccentric between said link and one of said parts, a lever for moving said eccentric, means for admitting fluid to the work in said chest, said means comprising a valve having an actuating key, said key having means to engage and hold said lever as it moves to clamping position and to move said key to valve opening position by contact with said lever means to lock said key in open valve position, means to release said key from said locking means and from said lever, and means to return said key upon said release.

5. Apparatus of the type described which comprises a chest in two parts, a link for connecting said parts, means for compressing said parts toward each other, said means comprising elements secured to one of said parts and to said link, a lever for moving said parts to compressing position, means for admitting fluid under pressure to the work in said chest, said means comprising a valve, a key on said valve having a recess, a pin on said lever engaging said recess to move said valve to open position as said lever moves to clamping position, said pin being locked in said recess, a detent for holding said key when in open valve position, said key being slidable to release it from said detent and to release said pin from said recess, and means for drawing said key to return position when released.

In witness whereof, we have hereunto signed our names.

HARRY WILLSHAW.
THOMAS NORCROSS.
FREDERICK GEORGE BROADBENT.